United States Patent [19]

Berti et al.

[11] Patent Number: 4,497,497
[45] Date of Patent: Feb. 5, 1985

[54] OIL RING ASSEMBLY WITH ANNULAR EXPANDER SPRING

[75] Inventors: Jerome L. Berti, Chicago Heights; Paul J. Patchen, Homewood, both of Ill.

[73] Assignee: Allis-Chalmers Corp., Milwaukee, Wis.

[21] Appl. No.: 623,010

[22] Filed: Jun. 21, 1984

[51] Int. Cl.³ .............. F16J 9/06; F16J 9/22; F16J 9/20
[52] U.S. Cl. .................. 277/163; 277/149; 267/1.5
[58] Field of Search ............ 277/139–141, 277/146, 149, 157, 163; 267/1.5

[56] References Cited

U.S. PATENT DOCUMENTS

| 2,439,702 | 4/1948 | Teetor | 277/163 |
| 2,848,288 | 8/1958 | Johnson | |
| 3,459,432 | 8/1969 | Reussner | 277/163 |
| 3,955,823 | 5/1976 | Willem | 277/163 |

FOREIGN PATENT DOCUMENTS 446646 7/1965 Japan .................. 277/163

Primary Examiner—Robert S. Ward
Attorney, Agent, or Firm—Charles L. Schwab

[57] ABSTRACT

An oil ring and coiled expander spring assembly in which the groove for the expander spring is of unique configuration and possesses a unique relationship with the expander spring.

7 Claims, 9 Drawing Figures

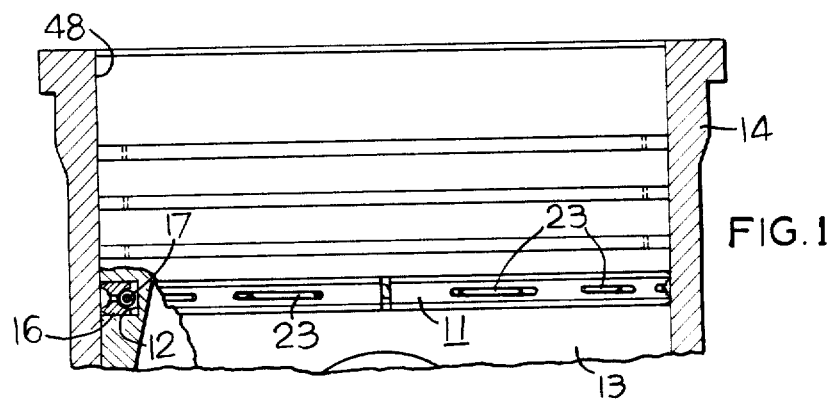
FIG. 1
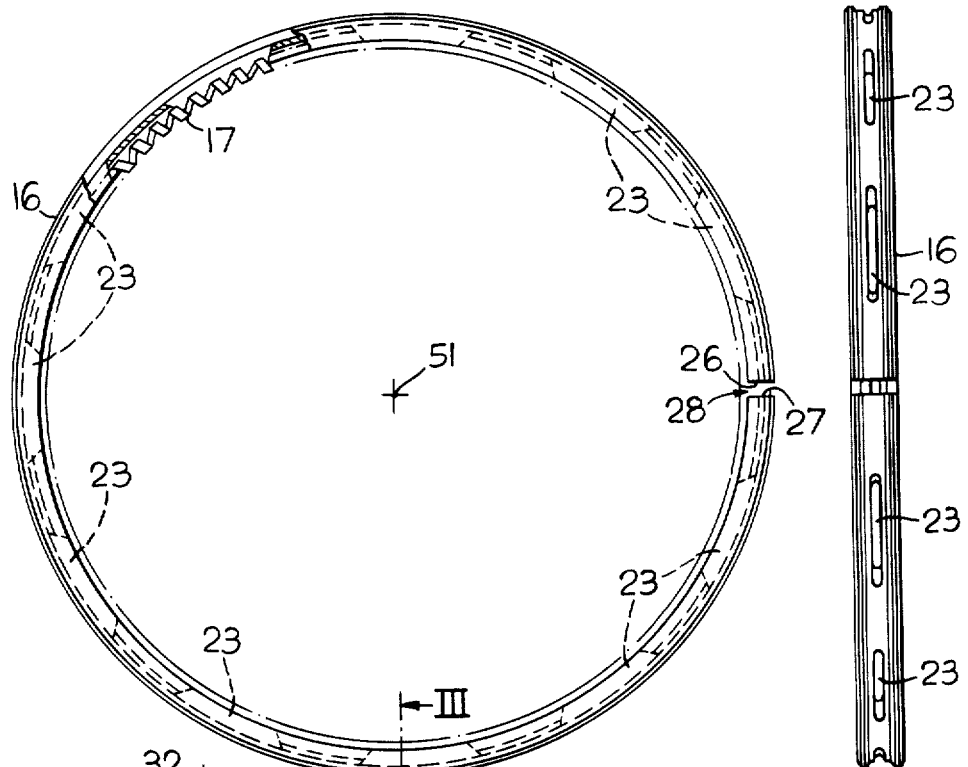
FIG. 2
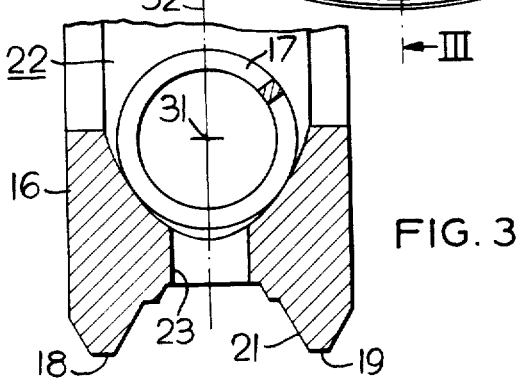
FIG. 3
FIG. 4

OIL RING ASSEMBLY WITH ANNULAR EXPANDER SPRING

BACKGROUND OF THE INVENTION

1. Technical Field

This invention relates to an oil ring assembly for an internal combustion engine piston.

2. Prior Art

U.S. Pat. No. 2,848,288 issued Aug. 19, 1958 to R. H. Johnson on a piston ring shows an oil ring assembly including a ring formed from a blank which is flat except for a reduced thickness area in the middle. After being bent to a desired shape and installed in a piston, the ring provides a pair of concave shoulders engaged by the coils of the expander ring. The coils of the expander ring do not engage the bottom of the trough formed by the reduced thickness area.

Section views of prior art oil ring assemblies are shown in FIGS. 5, 6, 7 and 8, in which the annular groove for the coiled expander spring includes circumferentially spaced slots. In the prior art construction shown in FIG. 5, the bottom 61 of the groove 62 is flat as viewed in section. During operation, the coils of the spring 63 tend to catch on the edges of the slots 64 thereby decreasing their effectiveness in biasing the ring 66. In the prior art shown in FIG. 6, the groove 72 in section is a part of a circle whose radius is greater than the radius of the coils of the expander spring 73. In this configuration, the coiled expander spring contacts the edges of the slots 74 causing excessively high loading. Also, the coils of the spring will catch on the end edges of the slots thereby decreasing the effectiveness of the coiled expander spring 73 in providing radially outward biasing force against the ring 76. In the prior art oil ring assembly shown in FIG. 7, the contact of the coils of the spring 83 with the tangential walls of the V-shaped groove 82 produces relatively high unit loading at the points of contact thereby tending to cause excessive wear. In the prior art construction of FIG. 8, the groove 92 for the expander spring 93 is formed by as bottom segment 95 having a radius less than the radius of the spring coils 93 by curved segments 96, 97 radially inward relative to the ring which have a radius larger than the coils of the expander spring 93 and by two conical surfaces 98, 99 (which are flat in the section view of FIG. 8) which are approximately tangential to the before-mentioned bottom and curved segments. Thus, the coils of the spring 93 bear against flat tapered sides of the groove 92 in somewhat the same manner as in the prior art design of FIG. 7 with the attendant high unit loading at the contact points between the spring coils and the groove surface.

SUMMARY OF THE INVENTION

The oil ring assembly of this invention includes an annular piston ring and an annular coiled expander spring. The ring is of the type having a gap in the circumference thereof to accommodate radial expansion and contraction and includes a radially inward facing circumferential groove in the inner periphery of the ring for receiving the expander spring. Wall means in the ring define a plurality of circumferentially spaced and aligned radial slots which extend radially between the bottom of the expander spring groove and an outer circumference of the ring. The surface of the expander ring groove is engaged by an annular coiled expander spring which exerts a radially outward force on the ring tending to cause the latter to expand. The points of intersection between a plane through to the axis of the ring and the surface of the groove define a parabola-like curve whose axis lies in a plane perpendicular to the axis of the ring. The radii of curvature of the groove surface gradually increase from the vertex inwardly relative to the piston. The curve may define a major axis end portion of an elongated ellipse. The contact points between the coils of the expander spring and the groove surface define a pair of annular bands spaced axially from and on opposite sides of the slots in the ring. Since the contacting surfaces have somewhat complementary curvatures, a band of contact results rather than a sharp line of contact. This affords low unit loading, relatively free movement of the coils in the groove and low rate of wear of the coils and groove during operation. When providing a groove with an elliptical shape, the ellipse defined by the groove surface may have a major radius which is approximately four times the outer radius of the coils of the expander spring and a minor radius less than one-half of the major radius. The groove and coils are proportioned to provide space between the coils and the bottom of the groove and to provide contact areas between the coils and the groove surface which are spaced axially of the slots so that even after considerable wear of the coils and groove surface, the coils will not contact the slot edges. The slots may be proportioned to be less than eight-tenths of the outer radius of the coils of the expander spring.

It is a primary object of this invention to provide an oil ring assembly in which the coiled expander spring does not embed itself in the oil slots in the bottom of the expander spring groove.

It is a further object of this invention to provide an oil ring and coiled expander spring combination wherein the expander spring does not contact the edges of the circumferentially spaced slots in the bottom of the expander spring groove in the ring.

It is a further object of this invention to provide an oil ring and coiled expander spring combination in which the radially inward facing groove for the expander spring in radial section is a curve of gradually increasing radii from its bottom.

It is a further object of this invention to provide an oil ring assembly in which the bands of contact between the coils of the expander spring and the groove are spaced from and on axially opposite sides of the slots in the bottom of the groove and in which the coils contact concave surfaces on opposite sides of the groove.

BRIEF DESCRIPTION OF THE DRAWINGS

One embodiment of the invention is illustrated in the drawings in which:

FIG. 1 is a side view showing part of a piston and piston liner with parts broken away for illustration purposes;

FIG. 2 is a top view of a piston ring and coiled expander spring assembly;

FIG. 3 is a view taken along the line III—III in FIG. 2;

FIG. 4 is an end view of the assembly shown in FIG. 2;

DETAILED DESCRIPTION OF THE DRAWINGS

Figure 5:
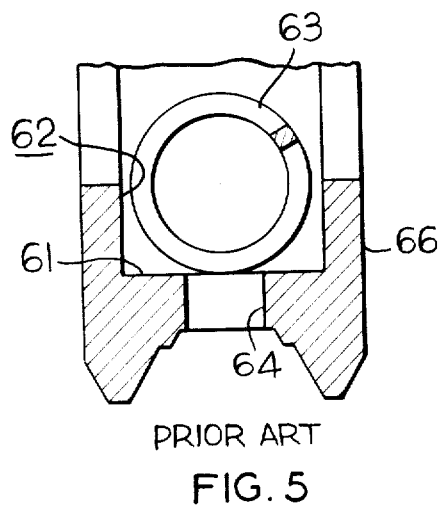
FIGS. 5, 6, 7 and 8 are sections of prior art oil ring and coiled expander spring assemblies.
Figure 7:
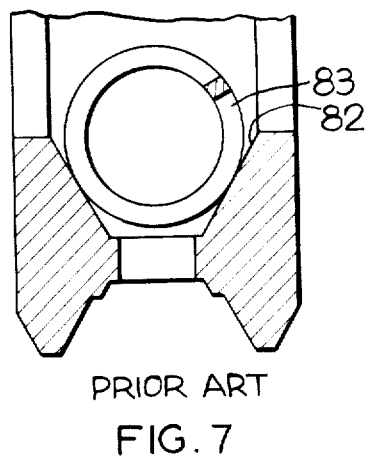
Figure 6:
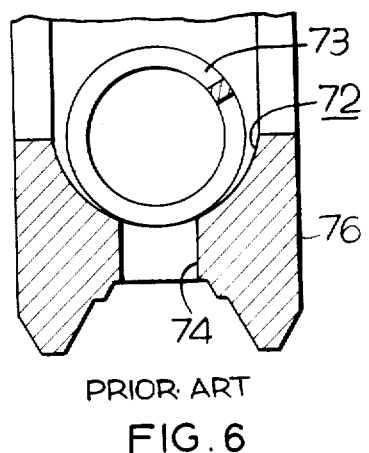
Figure 8:
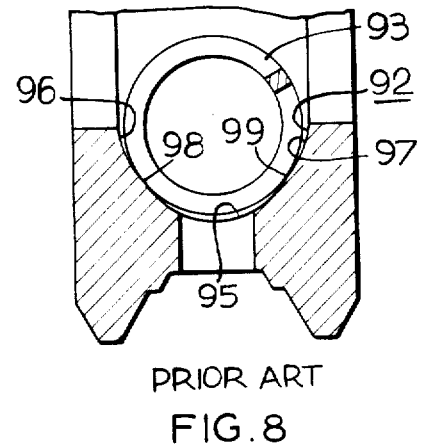

FIG. 1 shows the oil ring and coiled expander spring assembly 11 of this invention installed in an oil ring groove 12 of an internal combustion engine piston 13 which in turn is installed in a cylinder in the form of a cylinder liner 14. Referring also to FIGS. 2, 3 and 4, the oil ring and expander spring assembly is made up of two basic parts, namely, an annular oil ring 16 and an annular coiled expander spring 17. The oil ring 16 has a pair of axially spaced annular wiping or scraping edges 18, 19 on its radially outer periphery or circumference separated by a radially outward facing annular recess 21. A radially inward facing annular groove 22 is formed in the radially inner periphery of the ring 16 and the groove 22 and recess 21 are interconnected by a plurality of circumferentially spaced and elongated slots 23 extending radially therebetween. The ring 16 has circumferentially confronting end faces 26, 27 defining a gap 28 in the circumference of the ring for accommodating expansion and contraction of the oil ring 16 as it conforms to the expansion and contraction of the cylinder liner 14. The expander spring 17 is designed to expand circumferentially to resiliently urge the ring 16 to expand circumferentially. The axis 31 of the coils of the spring 17 lies in the central plane 32 of the ring 16 and the groove 22 and the slots, which plane is perpendicular to the axis 51 of the ring 16.

Figure 9:
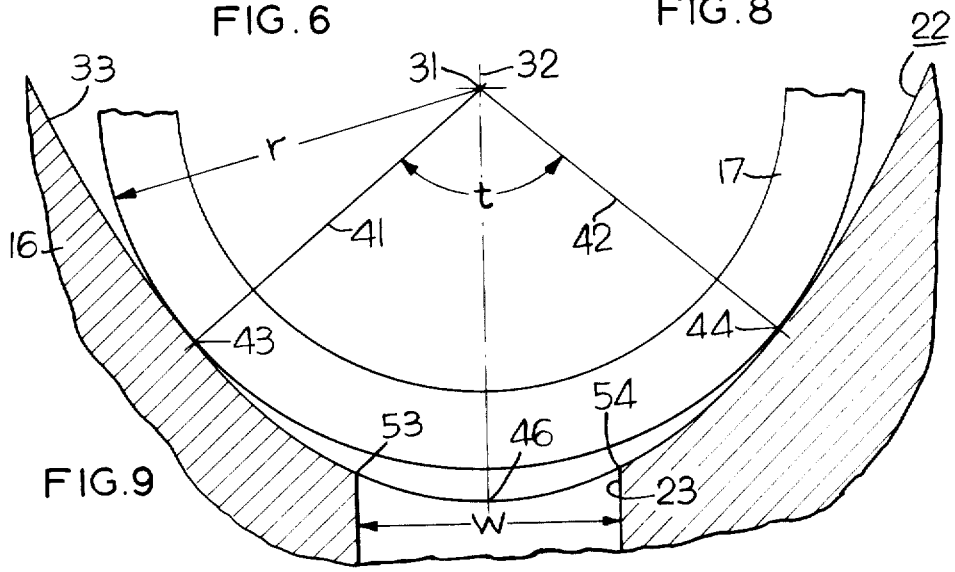
FIG. 9 is an enlarged view of a part of the structure shown in FIG. 3.

Referring also to FIG. 9, when the surface of the annular groove 22 is intersected by a plane through the axis 51, along the line III—III in FIG. 2 for instance, the points of intersection define a parabola-like curve 33 which in its preferred form is an end portion of the major axis end of an elongated ellipse. Using the equation for an ellipse, $$(x^2/a^2)+(y^2/b^2)=1$$

where x is the minor axis dimension; y is the major axis dimension; a is the minor axis radius and b is the major axis radius, we have found that a satisfactory curvature of surface 33 for the expander spring 17 whose coil has an outer radius r is generated by assigning values as follows:

a = 1.6876 times the radius r
b = 4 times the radius r

Thus, for an expander spring whose coils have an outer radius of 0.0525 inches, the ellipse equation becomes:

$$\frac{x^2}{(.0886)^2} + \frac{y^2}{(.21)^2} = 1$$

Although various slot widths may be satisfactory, we prefer the slot width w be not substantially greater than 0.8 times the radius r.

Using the foregoing elliptical equation, lines 41, 42 through the axis 31 of the spring coils and the points of contact 43, 44 between the coil 17 and the surface 33 on axially opposite sides of the slot 23 in the ring 16 intersect at an angle t of approximately 99°. The major axis of the elliptical surface 33 lies in the plane 32 and the angle t is bisected by the plane 32. The major axis end portion, including the major axis vertex 46 of the ellipse, is at the bottom of the groove 22 and is spaced radially outwardly from the coils of the expander spring thus facilitating flow of oil scraped from the interior surface 48 of the cylinder liner 14. The points of contact 43, 44 between the coils of spring 17 and the surface 33 of the groove 22 define annular bands of contact concentric with the axis 51 of the ring. The axis 51 is also the axis of the piston 13, cylinder surface 48 and the annular groove 22. The annular bands of contact are spaced axially from one another and are spaced axially from and on opposite sides of the slots 23. The contact bands are spaced sufficiently far from the axially opposite edges 53, 54 of the slots so that wear during the expected life of the parts, will not cause the coils of the spring 17 to contact the edges 53, 54. During operation, the coils of the spring 17 will not contact the sharp edges of the slots thus avoiding high stress contact, that is, high unit loading of spring contact. Since the spring 17 does not contact the circumferential ends or edges of the slot, the coils do not get hung up or become embedded in the slots and, thus, the spring retains its full resiliency and effectiveness. The concave curvature of the groove surface 33 and the somewhat complementary convex curvature of the coils of the spring 17 at the points of contact provide low unit loading. During operation of the engine, the points of contact 43, 44 become areas of contact with very low bearing loads per unit of contact area thus providing efficient transmission of thrust from the expander spring 17 to the oil ring 16 resiliently biasing the latter to circumferentially expand and maintain proper wiping contact with the cylinder wall of the engine.

Although we prefer to use an expander sring groove having a section which is elliptical in shape, a properly selected parabolic configuration is believed to provide satisfactory performance. Other parabola-like curves, which have gradually increasing radii from a vertex, are also believed satisfactory for carrying out this invention. One reason for preferring the elliptical shape is that the tool for making the groove can be made by cutting off cylindrical tool steel stock at an appropriate acute angle. The angle t may be varied somewhat without departing from the invention. We prefer an angle t of between approximately 60° and 110°. In other words, contact points 43, 44 approximately 60° to 110° from one another on the circumference of the coils of the spring 17 are believed to provide satisfactory performance within the objects of this invention.

The embodiments of the invention in which an exclusive property or privilege is claimed are defined as follows:

1. An oil ring assembly for an internal combustion engine piston comprising:
    an annular piston ring having a gap in the circumference thereof for accommodating radial expansion and contraction of said ring and having a radially inward facing circumferential groove in the inner periphery of said ring,
    wall means in said ring defining a plurality of circumferentially spaced slots extending radially between the bottom of said groove and an outer circumference of said ring,
    an annular coiled expander spring disposed in said groove, the coils of said spring being of a predetermined outer radius,
    the intersection of the surface of said groove by a radial plane defining a longitudinal end portion of an elongated ellipse whose major axis extends radially in relation to said ring, said predetermined outer radius of said spring coils and said ellipse being proportioned to provide radial space between the spring coils and the vertex of said end portion, the points of contact between the coils of said spring and said surface of said groove defining a pair of axially spaced annular bands spaced axially from axially opposite sides of said slots in said ring.

2. The oil ring assembly of claim 1 wherein the major radius of said ellipse is approximately four times said outer radius of said coils and wherein the minor radius of said ellipse is less than one-half of said major radius.

3. The oil ring assembly of claim 3 wherein said minor radius is approximately four-tenths of said major radius.

4. The oil ring assembly of claim 2 wherein the axial width of said slots is less than eight-tenths said outer radius of said coils and said slots are bisected by said major axis of said ellipse.

5. An oil ring assembly for an internal combustion engine piston comprising:
an annular piston ring having a gap in the circumference thereof for accommodating radial expansion and contraction of said ring and having a radially inward facing circumferential groove in the inner periphery of said ring,
wall means in said ring defining a plurality of circumferentially spaced slots extending radially between the bottom of said groove and an outer circumference of said ring,
an annular coiled expander spring disposed in said groove, the coils of said spring being of a predetermined outer radius and engaging the surface of said groove to radially bias said ring,
the surface of said groove cut by a plane perpendicular to the axis of said ring defining a parabola-like curve of gradually increasing radius of curvature from the bottom of said groove, the radius of curvature of the portion of said curve at the bottom of said groove being less than the outer radius of said coils whereby radial space is provided between said bottom of said groove and said coils, said coils contacting portions of said surface of said groove spaced from and disposed at opposite sides of said slots.

6. The oil ring assembly of claim 5 wherein the points of contact of said coils with said surface of said groove being disposed at approximately 60° to 110° from one another on the circumference of said coils.

7. An oil ring assembly for an internal combustion engine piston comprising:
an annular piston ring having a gap in the circumference thereof for accommodating radial expansion and contraction of said ring and having a radially inward facing circumferential groove in the inner periphery of said ring,
wall means in said ring defining a plurality of circumferentially spaced slots extending radially between the bottom of said groove and an outer circumference of said ring,
an annular coiled expander spring disposed in said groove, the coils of said spring being in thrust engagement with the surface of said groove so as to bias said ring radially outwardly,
the intersection of the surface of said groove by a plane perpendicular to the axis of said ring defining a parabola-like curve whose principal axis intersects and is perpendicular to the axis of said ring, said spring coils and said parabola-like curve being dimensioned to provide radial space between the spring coils and the vertex of said parabola-like curve, points of the contact between said coils of said spring and said surface of said groove defining a pair of axially spaced annular bands spaced axially from axially opposite edges of said slots in said ring.

* * * * *